United States Patent [19]

Ataras, III

[11] Patent Number: 5,668,738

[45] Date of Patent: Sep. 16, 1997

[54] DYNAMIC IDLE AGGREGATION IN DIGITAL SIGNAL TRANSMISSION

[75] Inventor: William S. Ataras, III, Portland, Oreg.

[73] Assignee: Intel Corporation, Santa Clara, Calif.

[21] Appl. No.: 657,839

[22] Filed: May 31, 1996

[51] Int. Cl.$^6$ .................................................. H04L 12/00
[52] U.S. Cl. ............................................................. 348/17
[58] Field of Search ............................ 364/514 C, 514 R, 364/487; 370/17, 60; 348/17, 180; 324/76.38

[56] References Cited

U.S. PATENT DOCUMENTS

| | | | |
|---|---|---|---|
| 5,222,028 | 6/1993 | Lebune et al. | 364/487 |
| 5,375,068 | 12/1994 | Palmer et al. | 364/514 R |
| 5,533,009 | 7/1996 | Chen | 370/17 |
| 5,546,324 | 8/1996 | Palmer et al. | 364/514 R |

OTHER PUBLICATIONS

ITU-T H.320, Narrow-Band Visual Telephone Systems and Terminal Equipment. International Telecommunication Union (Mar. 1993).

ITU-T H.221, Line Transmission of Non-Telephone Signals. International Telecommunications Union (Mar. 1993).

*Primary Examiner*—Emanuel T. Voeltz
*Assistant Examiner*—Thomas Peeso
*Attorney, Agent, or Firm*—William H. Murray

[57] ABSTRACT

Transmission of signals over a communications channel. An output of a digital signal generator is analyzed over a sampling interval and a duration of first digital signals generated over the sampling interval is determined, wherein any difference between the sampling interval and the duration of first digital signals is a remainder of the sampling interval. In one embodiment, the first digital signals are assembled into a contiguous block and transmitted over the communications channel. Second digital signals are transmitted over the communications channel for a period substantially equal to the remainder of the sampling interval.

22 Claims, 6 Drawing Sheets

Prior
Art

DYNAMIC IDLE AGGREGATION IN DIGITAL SIGNAL TRANSMISSION

BACKGROUND OF THE INVENTION

1. Field of the Invention

This invention relates to the field of digital signal transmission, and more particularly to oscillating different types of digital signals over a communications channel.

2. Background of the Related Art

Issues concerning digital signal transmission are prevalent in the field of video conferencing. An important issue is the allocation of limited transmission channel bandwidth for each of the video, data, audio and control signals which are transmitted over the communications channel during a video-data conference. Transmission channel bandwidth typically is expressed as a rate at which digital signals are carried over the channel, such as in bits per second (bps).

International Telecommunication Union (ITU) Recommendation H.320 (March 1993)—Narrow-band visual telephone systems and terminal equipment ("H.320") is a standard governing video conferencing over an Integrated Services Digital Network (ISDN). An ISDN typically includes two parallel communication channels, called "B" channels, each capable of carrying digital signals at a rate of, i.e. having a bandwidth of, 64 kilobits per second (kbps). The standard mandates that 16 kbps of the bandwidth of the first B channel be reserved for digital audio signals. Another 1.6 kbps on the first B channel is reserved for other signals, such as bitrate allocation signals (BAS), leaving a bandwidth of 46.4 kbps unassigned. The second B channel has 1.6 kbs of bandwidth allocated for signals such as BAS signals, leaving 62.4 kbps of bandwidth unassigned. Therefore, in conventional video conferencing configurations governed by the H.320 standard, a total of 108.8 kbps of channel bandwidth is unassigned and can transmit video.

Video conferencing under the H.320 standard requires transmission of digital signals at all times, i.e.., there can be no dead air. In typical video compression algorithms used in H.320 video conferencing, when there is little or no movement from frame-to-frame, relatively few digital video signals are generated. In order to maintain a constant flow of digital signals during such times, predefined "fill" digital signals are sent. Therefore, in typical H.320 video conferences, available bandwidth is wasted, i.e., it is occupied by more fill signals when there is little movement from frame-to-frame.

FIG. 1 shows a hypothetical timing diagram of conventional video transmission in a video conference under the H.320 standard over an arbitrarily chosen 140 millisecond (ms) time window. Compressed digital video signals typically are sent in bursts from a video encoder. As shown if FIG. 1, the video encoder has generated an initial 60 ms burst of video which typically is nearly simultaneously transmitted over the available video bandwidth across the ISDN. A period in which there is little or no movement follows as is apparent from the 10 ms idle period. Fill data is sent during the 10 ms idle period. Subsequently, there may be some movement causing generation of, for example, a 10 ms video period which is transmitted over the available video bandwidth. Thereafter, periods in which there is some movement, are followed by periods of little or no movement, for the remainder of the 140 ms time window. Although the time window chosen is strictly arbitrary, and the respective times of video generation and amount of video generated are hypothetical, they reflect possible video and fill data transmission behavior over an ISDN according to the H.320 standard. It should be understood that the respective times of video generation within a sequence of windows have an arbitrarily chosen duration and amounts of video generated, and hence the respective periods of video and fill data transmission, will vary on a window-by-window basis.

In an H.320 video conference with data (video-data conference), such as in application-sharing schemes, remote users share an application and enter information related to the sharing of the application, such as by keyboard and mouse input. Relatively large quantities of data, such as files, graphics and text in the format specified by ITU recommendation T.120, which falls under the umbrella of the H.320 standard, are transmitted across the communications medium along with the audio, video and control information transmitted during a conventional video conference. Typically, in such video-data conferencing configurations, a fixed amount of the total bandwidth available is reserved for T.120 data transmission. For example, bandwidth available for T.120 data transmissions in such video-data conferencing configurations might be one of 32 kbps or 48 kbps leaving, for example, 76.8 kbps or 60.8 kbps of bandwidth available to transmit video. Of course less or more bandwidth can be allocated for data transmissions in accordance with design criteria. Whatever the amount of bandwidth allocated for T.120 data, the remainder typically is used for video.

SUMMARY OF THE INVENTION

Transmission of signals over a communications channel. An output of a digital signal generator is analyzed over a sampling interval and a duration of first digital signals generated over the sampling interval is determined, wherein any difference between the sampling interval and the duration of first digital signals is a remainder of the sampling interval.

BRIEF DESCRIPTION OF THE DRAWINGS

The following detailed description will be more fully understood with reference to the accompanying drawings in which.

DETAILED DESCRIPTION OF THE PREFERRED EMBODIMENT

The invention is an advantageous and efficient method for oscillating two types of digital signals over a communications channel having a finite bandwidth in such a manner as to efficiently use the bandwidth. In one embodiment, surplus bandwidth in an ISDN channel is used to transmit T.120 data in place of fill signals while adhering to existing specifications and standards. In the embodiment, video output from a video engine is sampled over a sampling interval having a predetermined duration. The bandwidth allocated to video is adjusted according to the amount of video in the sample.

Figure 2:
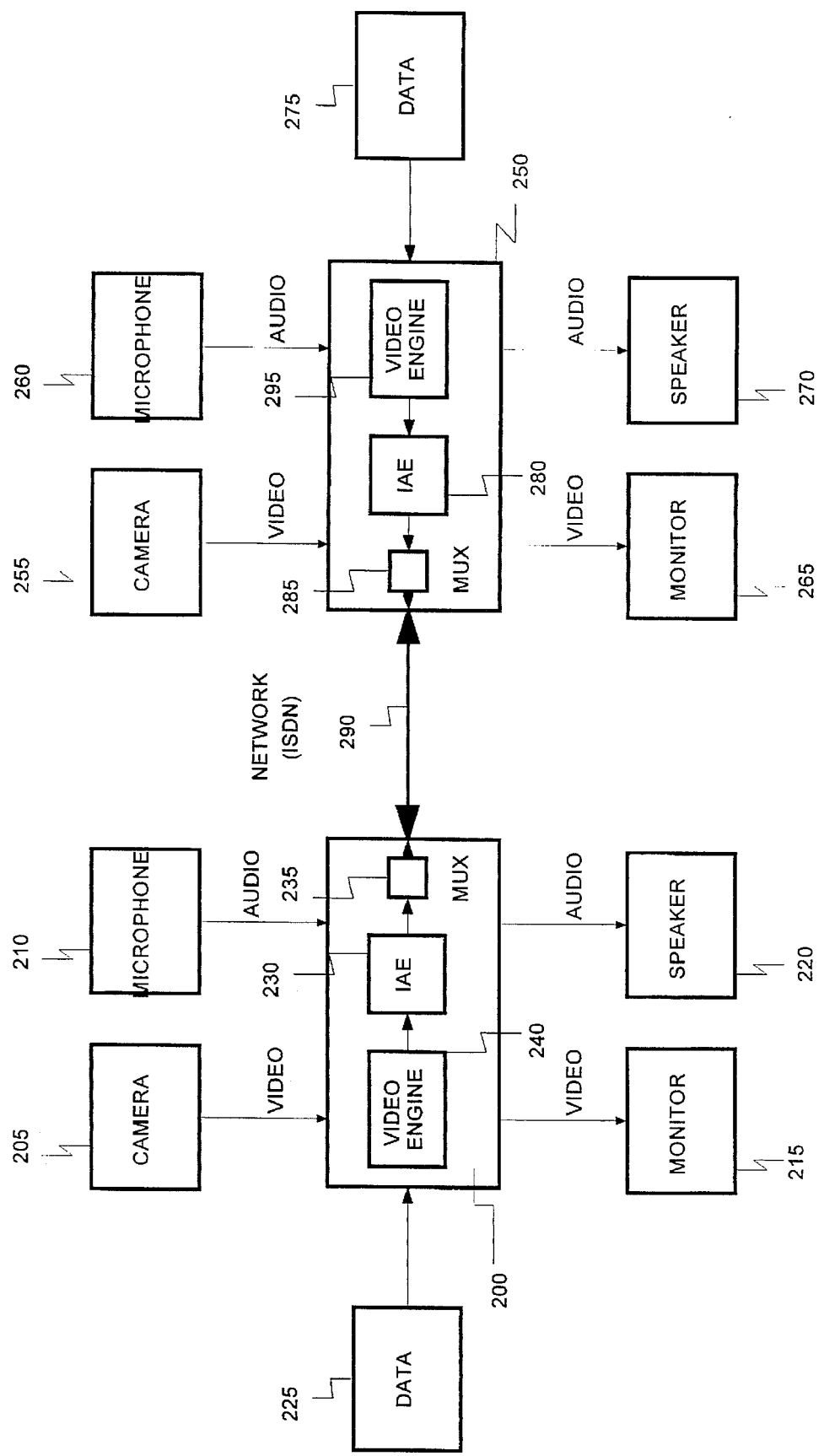
FIG. 2 is a block diagram of a video-data conferencing configuration according to the invention.

Referring to FIG. 2, a video-data conferencing configuration in accordance with the invention is shown. Conferencing systems 200 and 250 provide various control and processing functions to integrate the various components required to implement a video-data conference. Conferencing systems 200 and 250 each can be, for example, a personal computer with an Intel Corporation Pentium® processor or Pentium® Pro processor running a video-data conferencing application such as Intel Corporation's ProShare™ video conferencing software which supports application-sharing. Conferencing systems 200 and 250 also can be any other devices capable of controlling transmission and receipt of digital signals such as audio, video, .data and control signals during a video-data conference or other communications configuration and providing any necessary processing and switching of such signals.

Conferencing system 200 includes inputs for receiving video signals from camera 205 and audio signals from microphone 210. Conferencing system 200 further includes means for transmitting the video and audio signals over ISDN 290 to, for example, conferencing system 250 during a video-data conference.

Conferencing system 200 further controls receipt and distribution of video and audio signals received from a remote conference participant, such as from conferencing system 250, to monitor 215 and speaker 220, respectively, for reproduction of video and audio.

Conferencing system 200 further includes video engine 240. Engine 240 generates digital video signals from the input of camera 205 which are transmitted over ISDN 290. Engine 240 can compress the digital video signals if desired. Engine 240 also can decompresses signals that have been compressed by, for example, video engine 295 of conferencing system 250 and transmitted to conferencing system 200 over ISDN 290.

Data source 225 is a source of data signals, such as T.120 data, to be transmitted over ISDN 290 during a video-data conference according to the H.320 standard. Data source 225 can be, for example, a keyboard or a mouse or some other data input device known to those having skill in the art. Signals from data source 225 might first be processed or used in some manner by an application running on conferencing system 200, and can be, for example, files, graphics and text from a memory device that is a part of or is coupled to conferencing system 200. Data signals transmitted over ISDN 290, therefore, can be signals generated by an application running on conferencing system 200 in response to input from data source 225.

Conferencing system 200 further includes idle aggregation engine (IAE) 230. In one embodiment, IAE 230 receives an output of video engine 240. IAE 230 principally is responsible for controlling whether video or T.120 data shall be transmitted across available bandwidth of ISDN 290 as necessary for efficient use of the bandwidth. IAE 230 controls Mux 235 for this purpose.

Data, for example T.120 data sent over ISDN 290 in an H.320 video-data conference, is sent over a multi-layer protocol (MLP) channel. Mux 235 is responsive to commands generated by IAE 230 to multiplex the transmission of video and T.120 data over ISDN 290, thereby controlling the bandwidth dedicated to video and T.120 data transmission, respectively.

Figure 3:
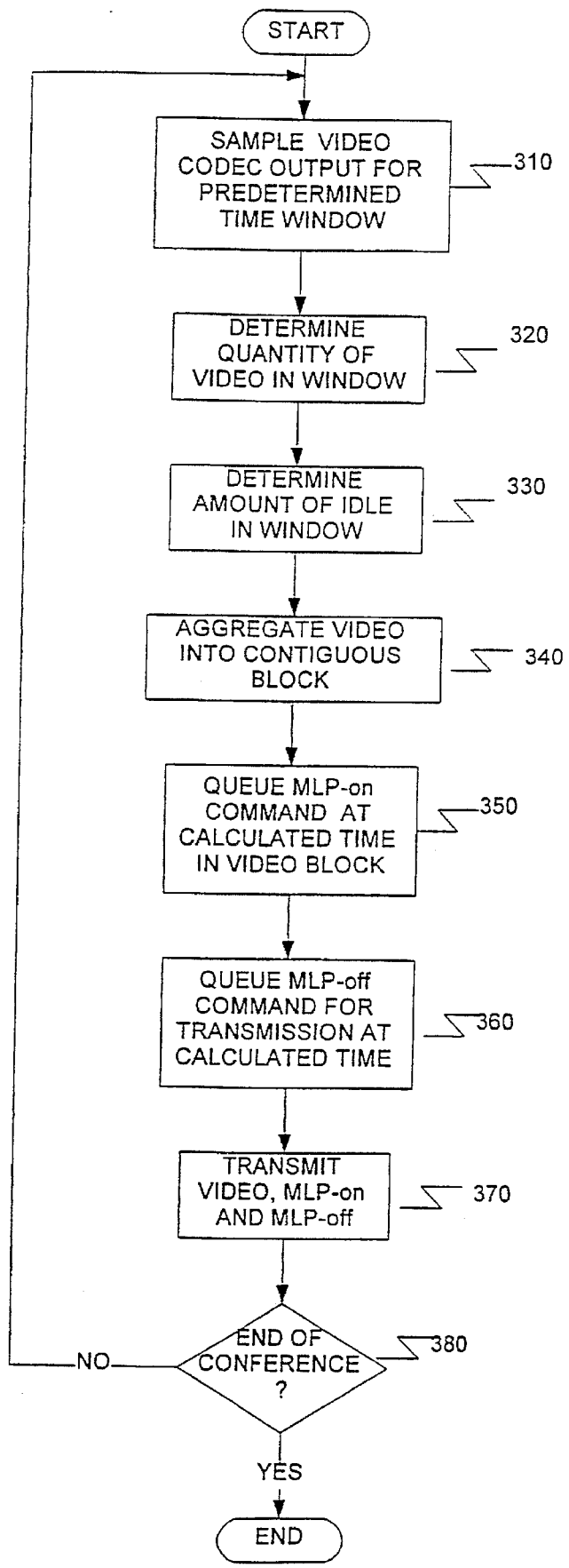
FIG. 3 is a flow chart detailing the operation of the idle aggregation engine of the invention.
Figure 4:
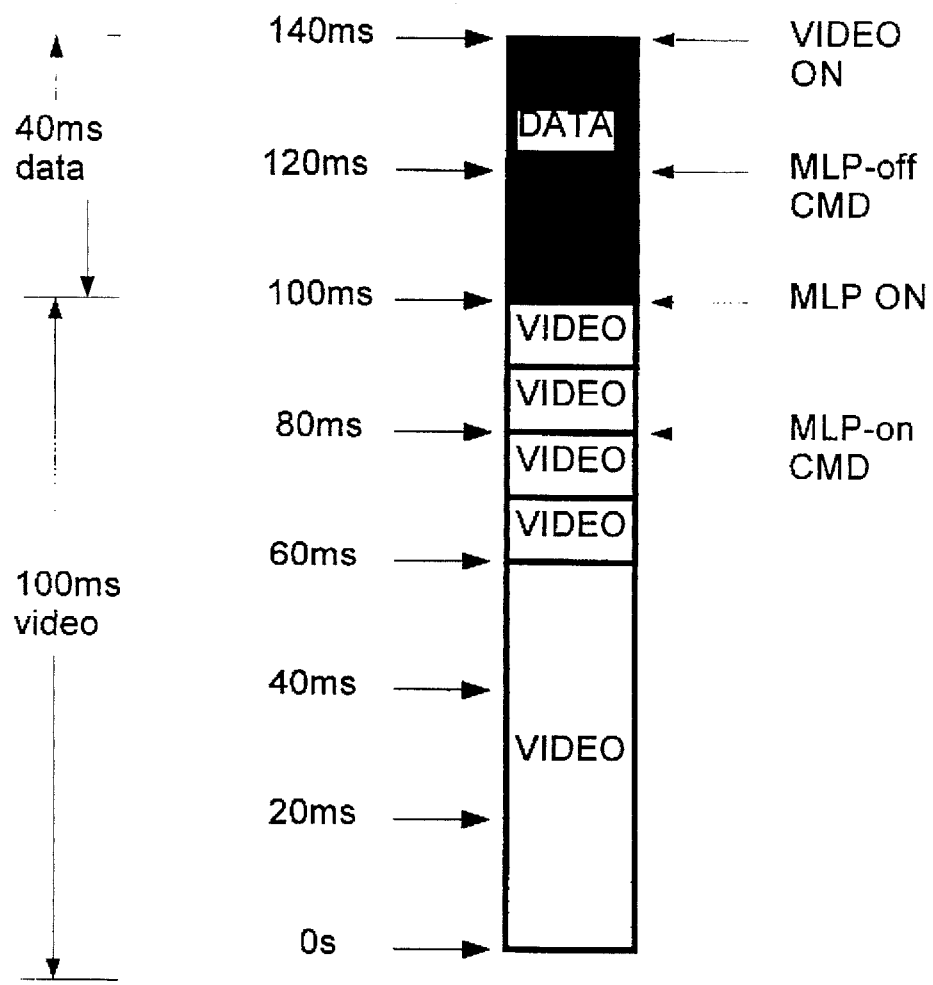
FIG. 4 is a possible signal timing diagram according to the invention.
Figure 5:
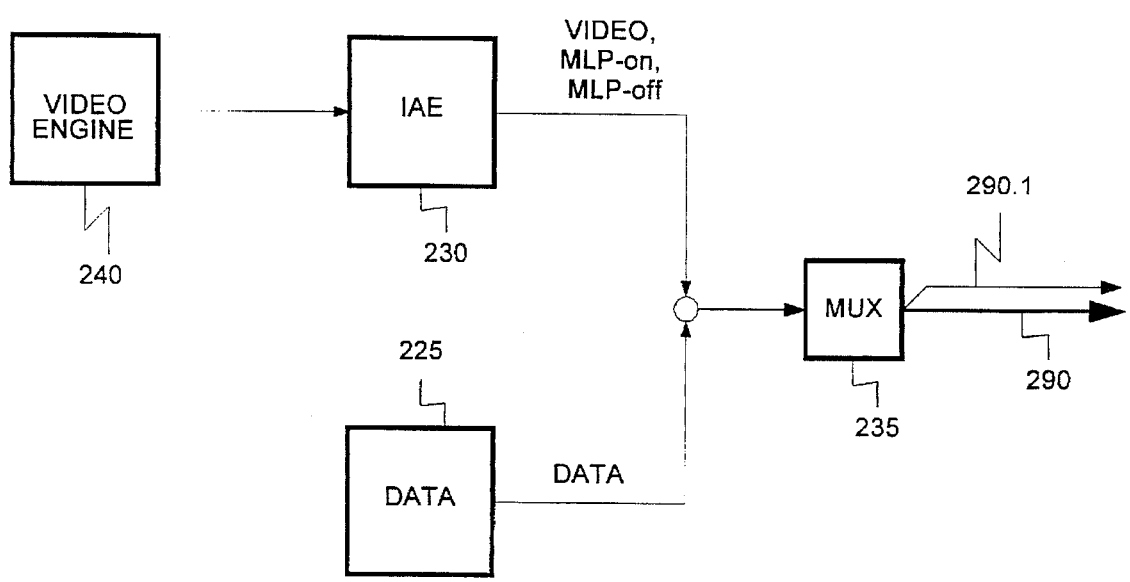
FIG. 5 is a block diagram of the multiplexing components of the invention.

Referring now to FIG. 3, a flow chart detailing the operation of IAE 230, FIG. 4, a signal timing diagram according to the invention, with general reference to FIG. 5, a block diagram of the multiplexing of the invention, IAE 230 samples an output of video engine 240 for a predetermined time interval (step 310 of FIG. 3). In the example shown in FIG. 4, the duration of the sampling interval is 140 ms. With knowledge of the rate in bits per second at which the sampled video will be transmitted over ISDN 290, for example 108.8 kbps, IAE 230, by counting the number of video bits received during the 140 ms sampling interval, determines how many milliseconds of video have been received for transmission over ISDN 290 during the 140 ms sampling interval (step 320). Based on the amount in milliseconds of video present, IAE 230 determines the amount of idle time in the sampling interval (which is the difference between 140 ms and the amount of video) (step 330). IAE 230 aggregates all of the video, which likely was generated in separate blocks over time by video engine 240, into a single contiguous block, as shown in FIG. 4 (step 340 of FIG. 3). If the example shown, 100 ms worth of discrete video signals are aggregated into a single 100 ms block. IAE 230 queues an MLP-on command at a calculated time to be sent in a BAS portion of one of the B-channels in ISDN 290 (step 350). An MLP-off command also is queued for transmission in the BAS channel at a calculated time (step 360), as described below. IAE 230 then causes conferencing system 200 to transmit the contiguous block of video and, at appropriate times, the queued MLP-on and MLP-off commands (step 370). Steps 310 to 370 are repeated until the end of the video-data conference (step 380). Preferably, IAE 230 performs some or all of steps 310–360 on one or more subsequent sampling intervals even before step 370 is performed for an earlier sample. Such concurrent processing will serve to lessen any latency introduced by the invention in the delivery of video.

As shown in FIG. 5, the MLP-on and MLP-off commands are bitrate allocation signals (BAS) which are carried in one of the BAS portions (290.1) of the two B-channels of ISDN 290. The MLP-on and MLP-off commands also control Mux 235 to turn on and off T.120 data transmission over ISDN 290. In one embodiment of the invention, when data is turned on, for example by an MLP-on command, all available bandwidth of ISDN 290, which excludes bandwidth set aside for audio, BAS and control information, is used to transmit T.120 data. The MLP-off command turns data off and video back on, i.e., all available ISDN bandwidth is used to transmit video.

In the invention, video and data are oscillated in time over the total bandwidth available, rather than being transmitted over dedicated, limited bandwidth channels. The oscillation is closely controlled to make efficient use of the total available bandwidth.

Figure 6:
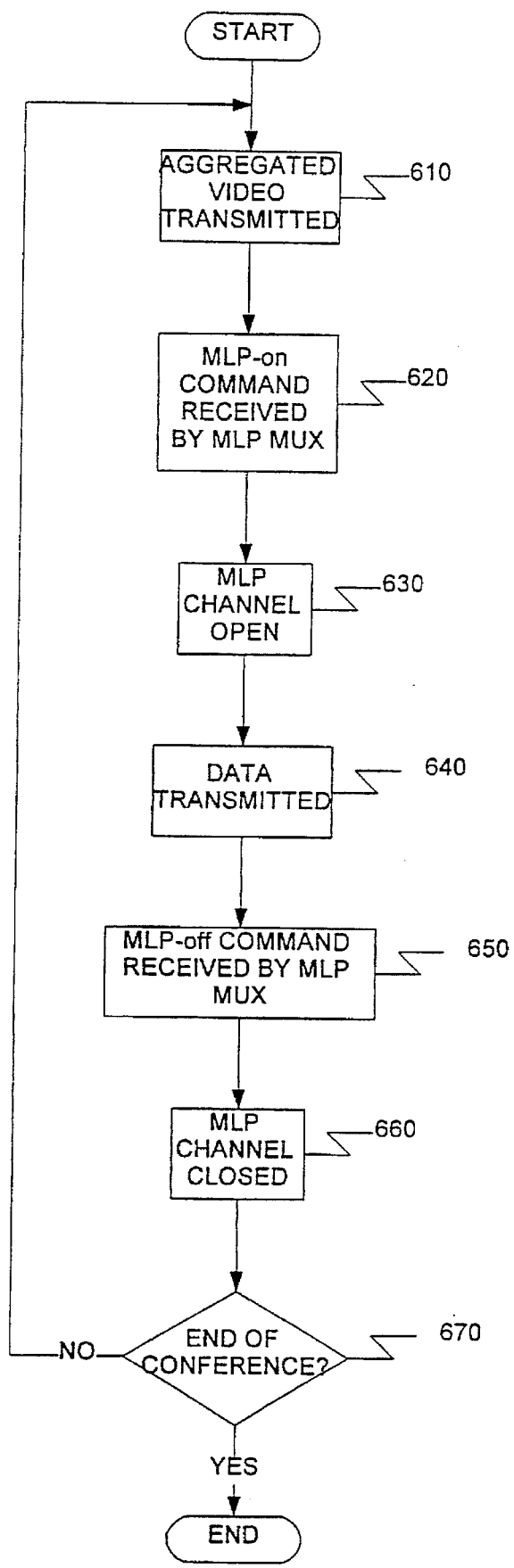
FIG. 6 is a flow chart of the actions occurring at the conclusion of an arbitrary 140 ms sampling window.

Referring also now to FIG. 6, which is a flow chart of the processing implemented after sampling the 140 ms interval of output from video engine 240, with continuing reference to FIGS. 4 and 5, the aggregated 100 ms block of video is transmitted (step 610 of FIG. 6). As shown in FIG. 4, the MLP-on command was queued for transmission at the 80 ms mark of the video block. Therefore, approximately 80 ms after transmission begins, the MLP-on command is received by Mux 235 of FIG. 5 (step 620). Typically, in accordance with ITU recommendation H.221 (July 1995) Frame Structure for a 64 to 1920 kbps channel in audiovisual teleservices ("H.221"), Mux 235 implements the MLP-on command approximately 20 ms after its receipt, concurrently with the start of the next 20 ms frame, and Mux 235 opens for the flow of T.120 data over ISDN 290 (step 630). T.120 data is transmitted using all of the available bandwidth of ISDN 290 (step 640). Therefore, rather than wasting bandwidth transmitting fill data, the invention allows for the transmission of real, i.e., T.120 data during the video idle time. The MLP-off command, queued for transmission at a time determined by IAE 230 (step 360 of FIG. 3), such as 20 ms before the end of the data transmission period, is received by Mux 235 (step 650). Because Mux 235 will not respond to the MLP-off command for approximately 20 ms, i.e. until the next frame as specified by the H.221 standard, it is likely that the MLP-off command will be received by Mux 235 during the period of T.120 data transmission. For example, referring to FIG. 4, the MLP-off command is transmitted at the 120 ms mark, during the 40 ms data transmission period. In any event, approximately 20 ms after receipt of the MLP-off command, Mux 235 will block the continued flow of T.120 data to ISDN 290 (step 660). Any video which has been accumulated and aggregated from a subsequent 140 ms sampling interval is delivered to ISDN 290 and is carried over all available bandwidth of ISDN 290. Unless the conference has ended, steps 610–660 will be repeated for the next interval of video engine 240 output sampled by IAE 230 (step 670).

Figure 1:
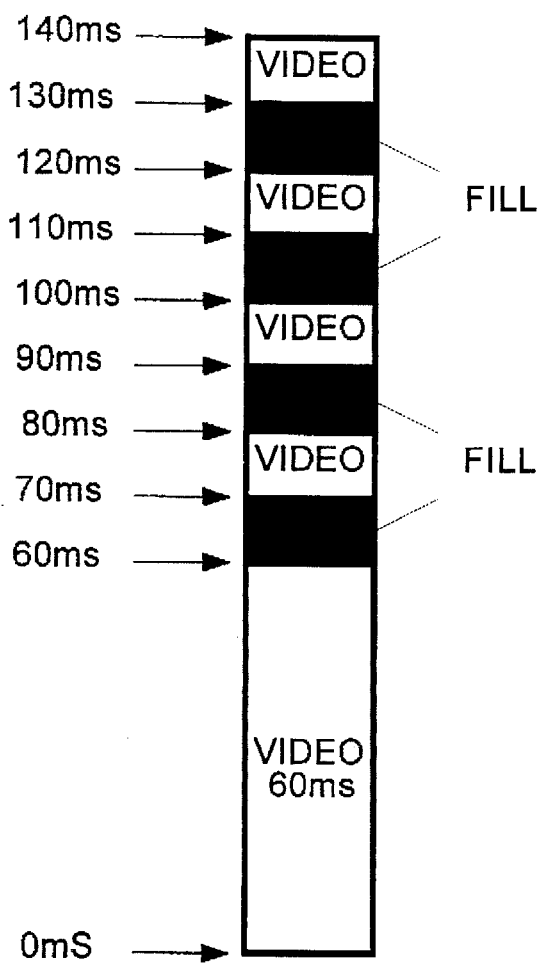
FIG. 1 is a hypothetical timing diagram of conventional video transmission in a video conference.

A person having ordinary skill in the art will recognize that FIG. 4 could be a representation of the timing diagram of FIG. 1 as processed by IAE 230 of the invention. For example, FIGS. 1 and 4 each depict 140 ms sampling interval during which a 60 ms block and four 10 ms blocks of video were generated by a video encoder. Each timing diagram shows that there are 40 ms of idle time in each 140 ms interval. As reflected in FIG. 4, however, IAE 230 aggregates the blocks of video, irrespective of the relative time when each was generated, into one contiguous 100 ms block of video. Compare this to FIG. 1 where the blocks of video are interspersed with blocks of idle.

It should be remembered that the 100 ms of video generated in the 140 ms sampling intervals shown in FIGS. 1 and 4 is just an example to explain the invention. A subsequent 140 ms sampling interval might have, for example, any amount of video.

A person having ordinary skill will recognize that the invention may introduce a latency period into the video stream. For example, in the embodiment discussed above where the video engine output is sampled in 140 ms increments, a latency period of up to 140 ms is introduced into the video stream, because each 140 ms sampling of output from the video engine is first held and sampled by IAE 230 before the video accumulated from the 140 ms sampling is transmitted over ISDN 290.

A person of ordinary skill will recognize that the 140 ms sampling intervals in FIGS. 1 and 4 were arbitrarily chosen. Larger or smaller intervals are possible in accordance with the invention. In fact, the size of the interval can change from sample to sample. When using the invention in a video conference being conducted according to the H.320 standard, because of the 20 ms delay under the H.221 standard between receipt of a MLP-on or MLP-off command by Mux 235 and the actual switch-over of transmission from video to data or vice versa over the available bandwidth of ISDN 290, there should be at least 20 ms of video and 20 ms of idle in each sampling interval. A person of ordinary skill will understand that certain BAS signals could occupy more than one 20 ms frame under the H.221 standard. In such instances, it will take longer than one 20 ms frame before the actual change of transmission from video to data or vice versa. In such cases there should be at least as much video and idle in each sampling as the accumulated time of the flames needed to carry the BAS command. This could require an extension of the duration of the sampling interval beyond, for example, the 140 ms shown.

In one embodiment, the available bandwidth in the second B channel, namely 62.4 kbps, is allocated solely for video. IAE 230 preferably passes a sufficient amount of video received from video engine 240 on to the second B channel, for example through Mux 235, in order to keep this channel full. In such an embodiment, video and T.120 data are oscillated over the first B channel only, which has 46.4 kbps of available bandwidth, in the manner described above.

In another embodiment, the detection of an idle period by IAE 230 in the manner described above can be used to trigger an increase in the quantity and, relatedly, quality of the video generated, such as by increasing the bitrate. In this embodiment, rather than transmitting T.120 data instead of fill signals to occupy the idle bandwidth, one or both of the quantizing levels or sampling rate are increased when converting the video to digital signals to increase the "density" of the video signals, such that for any given amount of video, more digital video signals are produced. The increased density video will occupy some or all of the otherwise unused, idle bandwidth, instead of fill signals.

In an alternative embodiment, rather than increasing the quantizing levels and/or the sampling rate, IAE 230 instructs video engine 240 to increase the frame rate, such that engine 240 outputs an increased number of frames per second. This also will generate more video to occupy some or all of the idle bandwidth detected by IAE 230.

It is conceivable that video may be generated at such a rate as to preclude the transmission of a sufficient amount of T.120 data in order to intelligently conduct the H.320 video-data conference in accordance with the invention. For example, if there is much movement before camera 205, significant amounts of video could be generated by video engine 240, leaving little idle time and consequently little unused bandwidth for the transmission of T.120 data. Therefore, in one embodiment of the invention, when there is insufficient bandwidth available to transmit T.120 data, IAE 230 instructs video engine 240 to decrease its rate of outputting video, such as by decreasing the frame rate, to limit the amount of video in each sampling interval. This will help ensure that a sufficient amount of bandwidth is reserved for T.120 data. Of course, Mux 235 must be commanded to transmit T.120 data at an appropriate time, such as in the manner described above. In an alternate embodiment, the video data can be made less dense, such as by decreasing one or both of the quantizing levels or sampling rate in response to a message from IAE 230, to free bandwidth for T.120 data.

A person having ordinary skill will understand that this invention is not limited to use where the communications medium is an ISDN or where the digital signals are being sent in accordance with the H.320 standard. Instead, the invention is useful whenever there are at least two types of digital signals which must be transmitted over any communications medium having a finite bandwidth. Moreover, the invention is not limited to use in video-data conferencing, but can be used generally wherever digital signals are being transmitted from one location to another.

The present invention can be embodied in the form of methods and apparatuses for practicing those methods. The present invention can also be embodied in the form of computer program code embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments combine with the microprocessor to provide a unique device that operates analogous to specific logic circuits.

It should be understood that various changes in the details, materials, and arrangements of the parts which have been described and illustrated in order to explain the nature of this invention may be made by those skilled in the art without departing from the principle and scope of the invention as expressed in the following claims.

What I claim is:

1. A method for transmitting blocks of time-sensitive data and blocks of other data over a communications channel, comprising the steps of:
    (a) generating sets of time-sensitive data for transmission over the communications channel in a computer system in which transitions between the blocks of time-sensitive and other data must be separated by a minimum duration;
    (b) characterizing the sizes of the sets of time-sensitive data; and
    (c) aggregating the sets of time-sensitive data as needed into the blocks of time-sensitive data to ensure that transmission of each block of time-sensitive data and each block of other data is longer than the minimum duration.

2. The invention of claim 1, wherein each set of time-sensitive data is a set of video data corresponding to a video frame.

3. The invention of claim 1, wherein the computer system conforms to International Telecommunication Union (ITU) H.320 standard.

4. The invention of claim 1, further comprising the step of queuing the blocks of time-sensitive data and other data along with commands to switch transmission between the time-sensitive data and the other data.

5. The invention of claim 1, wherein the communications channel is an integrated service data network (ISDN) channel.

6. The invention of claim 1, further comprising the step of queuing the blocks of time-sensitive data and other data along with commands to switch transmission between the time-sensitive data and the other data, wherein:
    each set of time-sensitive data is a set of video data correspond to a video frame;
    the computer system conforms to ITU H.320 standard; and
    the communications channel is an ISDN channel.

7. A storage medium encoded with machine-readable computer program code for transmitting blocks of time-sensitive data and blocks of other data over a communications channel, wherein, when executed by a computer system, the computer program code causes the computer system to:
    (a) generate sets of time-sensitive data for transmission over the communications channel in the computer system in which transitions between the blocks of time-sensitive and other data must be separated by a minimum duration;
    (b) characterize the sizes of the sets of time-sensitive data; and
    (c) aggregate the sets of time-sensitive data as needed into the blocks of time-sensitive data to ensure that transmission of each block of time-sensitive data and each block of other data is longer than the minimum duration.

8. The invention of claim 7, wherein each set of time-sensitive data is a set of video data correspond to a video frame.

9. The invention of claim 7, wherein the computer system conforms to ITU H.320 standard.

10. The invention of claim 7, wherein the computer program code further causes the computer system to queue the blocks of time-sensitive data and other data along with commands to switch transmission between the time-sensitive data and the other data.

11. The invention of claim 7, wherein the communications channel is an ISDN channel.

12. The invention of claim 7, wherein:
    the computer program code further causes the computer system to queue the blocks of time-sensitive data and other data along with commands to switch transmission between the time-sensitive data and the other data;
    each set of time-sensitive data is a set of video data corresponding to a video frame;
    the computer system conforms to ITU H.320 standard; and
    the communications channel is an ISDN channel.

13. An apparatus for transmitting blocks of time-sensitive data and blocks of other data over a communications channel, comprising:
    (a) a time-sensitive-data engine adapted to generate sets of time-sensitive data for transmission over the communications channel in a computer system in which transitions between the blocks of time-sensitive and other data must be separated by a minimum duration; and
    (b) an idle aggregation engine adapted to characterize the sizes of the sets of time-sensitive data and to aggregate the sets of time-sensitive data as needed into the blocks of time-sensitive data to ensure that transmission of each block of time-sensitive data and each block of other data is longer than the minimum duration.

14. The invention of claim 13, wherein each set of time-sensitive data is a set of video data corresponding to a video frame.

15. The invention of claim 13, wherein the computer system conforms to ITU H.320 standard.

16. The invention of claim 13, wherein the idle aggregation engine is adapted to queue the blocks of time-sensitive data along with commands to switch transmission between the time-sensitive data and the other data.

17. The invention of claim 13, wherein the communications channel is an ISDN channel.

18. The invention of claim 13, further comprising a multiplexer adapted to alternate transmission of the blocks of time-sensitive data and other data over the communications channel.

19. The invention of claim 13, wherein:
    the idle aggregation engine is adapted to queue the blocks of time-sensitive data along with commands to switch transmission between the time-sensitive data and the other data;
    each set of time-sensitive data is a set of video data corresponding to a video frame;

the computer system conforms to ITU H.320 standard;

the communications channel is an ISDN channel; and the apparatus further comprises a multiplexer adapted to alternate transmission of the blocks of video data and other data over the communications channel in response to the commands from the idle aggregation engine.

20. An apparatus for transmitting signals over a communications channel, comprising:

(a) a digital signal generator; and (b) an idle aggregation engine, wherein the idle aggregation engine analyzes an output of the digital signal generator over a sampling interval and determines a duration of first digital signals generated over the sampling interval, wherein any difference between the sampling interval and the duration of first digital signals is a remainder of the sampling interval.

21. The apparatus of claim 20, further comprising:

(c) a multiplexer, wherein the idle aggregation engine assembles the first digital signals into a contiguous block and transmits the contiguous block of first digital signals over the communications channel for a first period substantially equal to the duration of the first digital signals, and the multiplexer enables transmission of second digital signals for a second period substantially equal to the remainder of the sampling interval, the idle aggregation engine further generating control signals for controlling the multiplexer to transmit second digital signals at the conclusion of the first period and first digital signals at the conclusion of the second period wherein:

(1) the first digital signals are digital video signals and the second digital signals are data signals;

(2) the communications channel is an integrated services digital network;

(3) the control signals are bitrate allocation signals; and (4) the apparatus is used in an H.320 video conference with data.

22. The apparatus of claim 20, wherein the idle aggregation engine instructs the digital signal generator to change a rate of output of digital signals.

\* \* \* \* \*